US012534091B2

(12) United States Patent
Schreier et al.

(10) Patent No.: US 12,534,091 B2
(45) Date of Patent: Jan. 27, 2026

(54) METHOD AND SYSTEM FOR DETERMINING SENSOR ERRORS AND/OR LOCALIZATION ERRORS

(71) Applicant: Continental Autonomous Mobility Germany GmbH, Ingolstadt (DE)

(72) Inventors: Matthias Schreier, Heppenheim (DE); Matthias Komar, Heppenheim (DE); Linda Schubert, Kressbronn (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 82 days.

(21) Appl. No.: 18/339,257

(22) Filed: Jun. 22, 2023

(65) Prior Publication Data

US 2023/0415756 A1    Dec. 28, 2023

(30) Foreign Application Priority Data

Jun. 23, 2022   (DE) ..................... 10 2022 206 348.1

(51) Int. Cl.
*B60W 50/02*    (2012.01)
*B60W 40/02*    (2006.01)

(52) U.S. Cl.
CPC ........ *B60W 50/0205* (2013.01); *B60W 40/02* (2013.01); *B60W 2050/021* (2013.01); *B60W 2050/0215* (2013.01); *B60W 2556/65* (2020.02)

(58) Field of Classification Search
None
See application file for complete search history.

(56) References Cited

U.S. PATENT DOCUMENTS

| 11,143,515 B2 | 10/2021 | Schreier |
| 2007/0198156 A1* | 8/2007 | Yamada ................. B60Q 1/085 |
| | | 701/532 |

(Continued)

FOREIGN PATENT DOCUMENTS

| DE | 102012011538 A1 | 1/2013 |
| DE | 102012219637 A1 | 4/2014 |

(Continued)

OTHER PUBLICATIONS

German Office Action dated Feb. 2, 2023 of priority application DE 10 2022 206 348.1.

(Continued)

*Primary Examiner* — Arslan Azhar
(74) *Attorney, Agent, or Firm* — Buchanan Ingersoll & Rooney P.C (57) ABSTRACT

A method for determining sensor errors and/or localization errors of a vehicle, including: recording a vehicle environment of an ego vehicle by means of at least one environment perception sensor of the ego vehicle; generating an environment representation based on the recording by the environment perception sensor; analyzing the environment representation in the ego vehicle by means of an analysis unit; determining environment information based on the analysis of the environment representation; entering the environment information in an environment model; determining at least one further vehicle in the environment representation from the at least one environment perception sensor of the ego vehicle; transmitting information from the at least one further vehicle to the ego vehicle by means of a vehicle-to-vehicle communication unit; comparing the transmitted information with the environment information from the ego vehicle; determining a sensor error and/or localization error based on the result of the comparison of the transmitted (Continued)

information and the environment information from the ego vehicle.

8 Claims, 4 Drawing Sheets

(56) References Cited

U.S. PATENT DOCUMENTS

| | | | | |
|---|---|---|---|---|
| 2007/0198177 | A1* | 8/2007 | Yamada | G01C 21/30 340/995.1 |
| 2013/0120159 | A1 | 5/2013 | Stahlin et al. | |
| 2015/0286754 | A1 | 10/2015 | Stahlin et al. | |
| 2018/0322711 | A1* | 11/2018 | Weimerskirch | G06N 20/00 |
| 2020/0361480 | A1* | 11/2020 | Rodriguez Bravo | B60W 60/0015 |
| 2021/0206389 | A1* | 7/2021 | Kim | G01C 21/3885 |
| 2023/0055708 | A1* | 2/2023 | Lee | B60W 60/001 |
| 2023/0236317 | A1* | 7/2023 | Fina | G01S 13/951 342/26 B |

FOREIGN PATENT DOCUMENTS

| | | |
|---|---|---|
| DE | 102016223830 A1 | 5/2018 |
| DE | 102018203376 A1 | 9/2019 |
| DE | 102010018088 B4 | 10/2020 |
| WO | 2012013553 A3 | 10/2012 |

OTHER PUBLICATIONS

Li, H. et al.: Multi-vehicle Cooperative Local Mapping: A Methodology based on Occupancy Grid Map Merging, in: IEEE Transactions on Intelligent Transportation System, vol. 15 (5) Oct. 2014.

* cited by examiner

METHOD AND SYSTEM FOR DETERMINING SENSOR ERRORS AND/OR LOCALIZATION ERRORS

The present application claims priority from German Patent Application No. 10 2022 206 348.1 filed on Jun. 23, 2022, in the German Patent and Trade Mark Office, the content of which is herein incorporated by reference.

BACKGROUND

1. Field

Aspects and objects of embodiments of the present application relate to a method and a system for determining sensor errors and/or localization errors.

2. Description of Related Art

Vehicles can have various assistance systems based on sensor-based environment perception. Various sensor systems are used for environment perception.

The field of V2X communication includes, amongst other things, the exchange of data via a radio link directly between vehicles in specified data containers, Collective Perception Message, etc.). The CAM contains positional and dynamics data from the sender; the CPM contains the sensor-based environment model of the sender.

Document WO2012013553A3, for example, discloses existing V2V or V2I approaches, which are used primarily for exchanging independently obtained vehicle environment information, which each vehicle or roadside unit generates separately. In addition, the prior art already includes exchanging and merging occupancy grid maps or parametric free-space maps to convey free spaces suitable for driving October 2014" or U.S. Pat. No. 11,143,515B2). The environment information exchanged in this way is either used by vehicles equipped with suitable receivers, in order to complete their local environment model by means of data fusion approaches, or is merged centrally, for instance in a roadside unit or in the backend, and then sent to the relevant vehicles.

With regard to the telediagnosis of vehicles, data relevant to maintenance and/or repair and detected by the vehicle is relayed by communication equipment to a diagnostic system, which determines, and transfers back to the vehicle, maintenance/repair measures.

The problem with conventional systems is that sensors for environment perception are decalibrated, damaged, dirty or fail completely. This can result in, for example, objects in the vehicle's environment being detected in an incorrect position or even not being detected at all.

Furthermore, the ego-localization may be erroneous or inaccurate, and hence the ego vehicle may be adopted in a digital map in an incorrect position, for example.

Both malfunctions result in a vehicle being unable to drive in an automated manner, or in assistance systems being unable to work.

SUMMARY

Therefore it is an object of the present application to provide a method and a system that make it possible to detect errors in different vehicle systems and hence increase the reliability of the environment perception and localization.

The first considerations were that for vehicles driving in an automated manner, it is fundamentally important that the ego-localization and environment perception are working. As yet, however, cooperative surround-sensor based error-detection has not taken place across vehicle boundaries.

According to an aspect of an embodiment, there is provided a method for determining sensor errors and/or localization errors of a vehicle, including: recording by means of at least one environment perception sensor of an ego vehicle a vehicle environment of the ego vehicle; generating an environment representation based on the recording by the environment perception sensor; analyzing the environment representation in the ego vehicle by means of an analysis unit; determining environment information based on the analysis of the environment representation; entering the environment information in an environment model; determining at least one further vehicle in the environment representation from the at least one environment perception sensor of the ego vehicle; transmitting information from the at least one further vehicle to the ego vehicle by means of vehicle-to-vehicle communication; comparing the transmitted information with the environment information from the ego vehicle; determining a sensor error and/or localization error based on the result of the comparison of the transmitted information and the environment information from the ego vehicle.

The at least one environment perception sensor can be, for example, a mono camera or stereo camera oriented in the direction of travel. Other sensors such as radar or lidar sensors, for instance, would also be conceivable. It would also be conceivable to use a plurality of identical and/or different sensors for environment perception. This is particularly advantageous because different sensors perceive different features with different levels of effectiveness. A plurality of environment representations are accordingly generated given a plurality of different sensors. For example, the environment representation in the case of a camera is a camera image or a series of camera images; in the case of a radar, it can be an object list, for example.

Environment information can then be determined from this environment representation or these environment representations. This information can comprise, for example, the presence of dynamic objects such as a further vehicle, for instance, or static objects such as lane boundaries or landmarks, for instance, and a position of the static and dynamic objects.

This information is then entered in an environment model. The environment model is in the form of an occupancy grid, for example. This is advantageous because in an occupancy grid, the dynamic and static objects can be entered systematically and also, if applicable, the movement of the dynamic objects can be predicted and tracked. Alternatively, the environment model can also be in the form of a free-space map.

From the environment information, it is possible to determine a further vehicle, for instance from the camera image.

The ego vehicle and the at least one further vehicle have an apparatus for vehicle-to-vehicle communication V2V in order to send and receive information. Both vehicles also have means for localization. The ego vehicle can locate itself in the created environment model, for example, or in an existing digital map, for instance provided by a navigation device.

The further vehicle transmits information to the ego vehicle, which the ego vehicle compares with its own environment information. By comparing the information, it can be ascertained in the ego vehicle whether, for example, the objects were detected correctly in the perception region of the at least one environment perception sensor of the ego vehicle. For example, the localization information from the further vehicle can be compared with the detection by the ego vehicle. If a difference is ascertained, it can involve either a detection error by the ego vehicle, a localization error by the ego vehicle or a localization error by the further vehicle, or erroneous transmitted information. Further information can be used in order to identify the direct error source more precisely. In addition, the positions of objects perceived by both the ego vehicle and the further vehicle can be compared in order to ascertain whether the error lies in the ego vehicle detection.

The term "sensor error" comprises an error by the environment perception sensor or the sensors of the ego vehicle. The term "localization error" can comprise an error in the localization by the ego vehicle, in the localization by the further vehicle, or an error in the transferred information from the further vehicle. The transferred information can be transferred by means of special messages, which can contain errors even if the localization by the further vehicle is correct.

In a preferred configuration, neural networks and/or probabilistic models and/or fuzzy logic approaches and/or probabilistic logic are used to determine the error. The use of the particular model depends on available data for black-box learning from relevant differences between sensor-based environment models and information transferred by vehicle-to-vehicle communication equipment, V2V communication equipment, or to what extent it is relevant that humans shall be able to trace the error case determined by the system. Hence the determining of the error can be realized using different approaches according to the assessment focus and data source.

In a further advantageous configuration, after determining the error, it is ascertained whether the error is present in the ego vehicle or in the at least one further vehicle. This is advantageous because in the event that the error is ascertained in a driver's own car, the driver, for example, can be notified of the error, and relevant driver assistance systems can be deactivated depending on the error. If the error is present in the further vehicle, then the further vehicle can be informed about the error that is present, and relevant measures such as deactivating driver assistance systems or autonomous systems can be initiated. It would also be conceivable that the information about a defective system in a further vehicle is sent to a backend server, in which this information is collected, and in the event that messages about errors in this vehicle exceed a specified threshold value, the associated vehicle is informed about the error that is present.

It is also preferred that in order to determine the error, further information is transmitted from additional vehicles and used, which detect the ego vehicle and/or the at least one further vehicle by means of at least one environment perception sensor. This is advantageous in order to be able to isolate the cause of the error better. For instance, the additional vehicles can transmit their environment models, in which are entered at least the ego vehicle or else the further vehicle. Thus this data can be used in the comparison in order to be able to identify the error more precisely.

In a further preferred embodiment, the information from the at least one further vehicle and from the additional vehicles is transferred by means of a CAM and/or a CPM. These messages are advantageous because the CAM message contains the absolute position data, and the CPM message contains, for example, the environment model of the vehicle concerned.

In a further particularly preferred embodiment, the determining of the sensor error and/or localization error takes into account uncertainties in the position of the further vehicle in the CAM message and/or uncertainties in the position of the further vehicle, which position is detected by the ego vehicle and tracked in the environment model. These uncertainties can be described as a geometric shape around the further vehicle or the tracked object. If then a difference is ascertained between communicated position and detected or tracked position, it can advantageously be checked whether the difference is within the range of uncertainty. It can hence be advantageously prevented that an error is determined even though, for example, the ego-sensors have no error and instead the difference is caused solely by the measurement uncertainty of the environment perception sensor.

In a preferred configuration, the determining of the sensor error and/or localization error takes into account driving context knowledge. In this case, driving context knowledge comprises, for example, the knowledge about the number of lanes or a lane direction. For example, if the further vehicle transfers a position outside the lanes suitable for driving, and if the ego vehicle detects the further vehicle on a lane that is suitable for driving, then it can be assumed that an error exists either in the localization or in the CAM message.

According to an aspect of an embodiment, there is provided a system for determining sensor errors and/or localization errors, comprising at least one environment perception sensor, an analysis unit, a V2V communication unit, and a computing unit, wherein the computing unit is configured to perform a method of the type mentioned in the introduction.

BRIEF DESCRIPTION OF THE DRAWINGS

Further advantageous configurations and embodiments are the subject matter of the drawings, in which.

DETAILED DESCRIPTION

Figure 1:
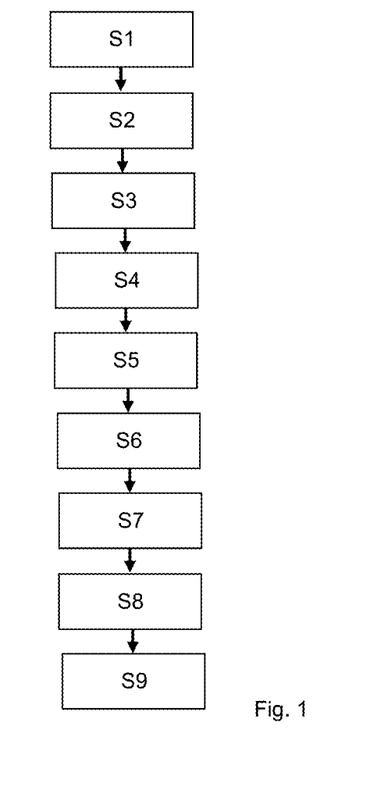
FIG. 1 is a flowchart illustrating a method of determining sensor error, according to an embodiment.

FIG. 1 shows a schematic flow diagram of a method according to a configuration of the embodiment. In step S1, at least one environment perception sensor of an ego vehicle 6 is used to record a vehicle environment of the ego vehicle 6. In a step S2, an environment representation is generated based on the recording by the environment perception sensor 2. In a further step S3, the environment representation is analyzed in the ego vehicle 6 by means of its analysis unit 3. In a subsequent step S4, environment information is determined based on the analysis of the environment representation. In step S5, the environment information is entered in an environment model. Then, in step S6, at least one further vehicle 7 is determined in the environment representation of the at least one environment perception sensor 2 of the ego vehicle 6. In a further step S7, information is transmitted by means of V2V communication from the at least one further vehicle 7 to the ego vehicle 6. Then, in step S8, the transmitted information is compared with the environment information from the ego vehicle 6. Finally, in step S9, a sensor error and/or localization error is determined based on the result of the comparison of the transmitted information and the environment information from the ego vehicle 6.

Figure 2:
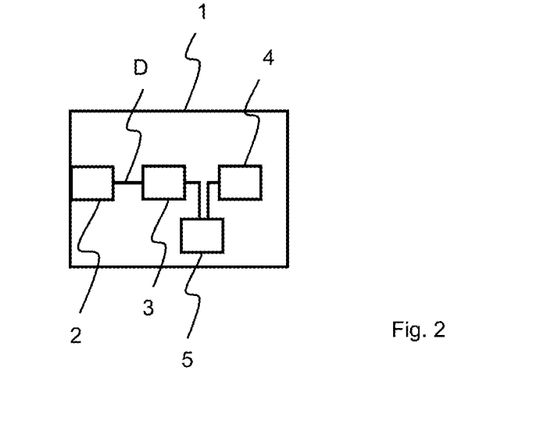
FIG. 2 is a diagram illustrating a system for detecting sensor error, according to an embodiment.

FIG. 2 shows a schematic representation of a system according to a configuration of the embodiment. The system 1 has at least one environment perception sensor 2, an analysis unit 3, a V2V communication unit 4, and a computing unit 5. The computing unit 5 is configured such that a method for determining a sensor error and/or localization error can be performed. The environment perception sensor 2 is connected to the analysis unit 3 by means of a data connection D. The analysis unit 3 analyzes, for example, the environment representation generated by the environment perception sensor 2. In the computing unit 5, environment information can then be determined and entered in an environment model. The V2V communication module 4 receives information from at least one further vehicle 7, 8a, 8b, and sends information to other vehicles 7, 8a, 8b. This information is likewise provided to the computing unit 5 via a data connection D. The computing unit 5 compares the environment information and the received information, and determines a sensor error and/or localization error. The data connection D can be wired or wireless.

Figure 3:
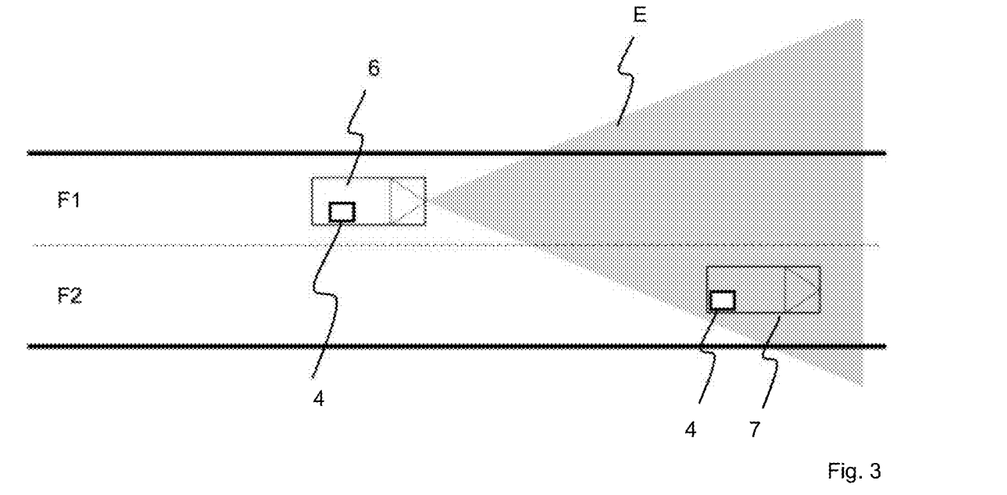
FIG. 3 is a diagram illustrating a schematic representation of a scene, according to an embodiment.

FIG. 3 shows a schematic representation of a scene according to an embodiment of the embodiment. In this case, the ego vehicle 6 is situated in a first lane F1. The ego vehicle 6 perceives in the perception region E of the environment perception sensor 2 a further vehicle 7 in a second lane F2. Both vehicles 6, 7 are equipped with a V2V communication unit 4, and can accordingly send and receive information. The further vehicle 7 can now transfer to the ego vehicle 6 its absolute position data, for example. A comparison of the perceived position and the transferred position data then takes place in the ego vehicle 6 with the aid of the existing absolute position of the ego vehicle 6 from its localization. Differences in this case can infer either erroneous ego-localization, defective ego-sensors, or an erroneous CAM message, for example resulting from erroneous self-localization by the further vehicle 7. For reasons of clarity, in the subsequent FIGS. 4-8, the V2V communication unit 4 is not shown explicitly in the vehicles 6, 7, 8a, 8b. Nevertheless, all the vehicles in the figures have a V2V communication unit 4 in order to receive and transmit information.

If, in this configuration, an error in the communicated data from the further vehicle 7 was ascertained, and if, over the further course of time, no further vehicles 7 occur for which a difference between communicated and detected data is ascertained, this is an indication that the error lay in the communicating vehicle 7. The unique ID of this vehicle 7 could then be transmitted to a backend server which collects the information about this vehicle and, after a threshold value is reached, informs the vehicle. On the other hand, the communicating vehicle 7 could also be informed directly via V2V about the possible error. In this vehicle 7 itself, it could then be inferred from the repeated arrival of this information from different vehicles that there is an actual error in the vehicle itself.

Figure 4:
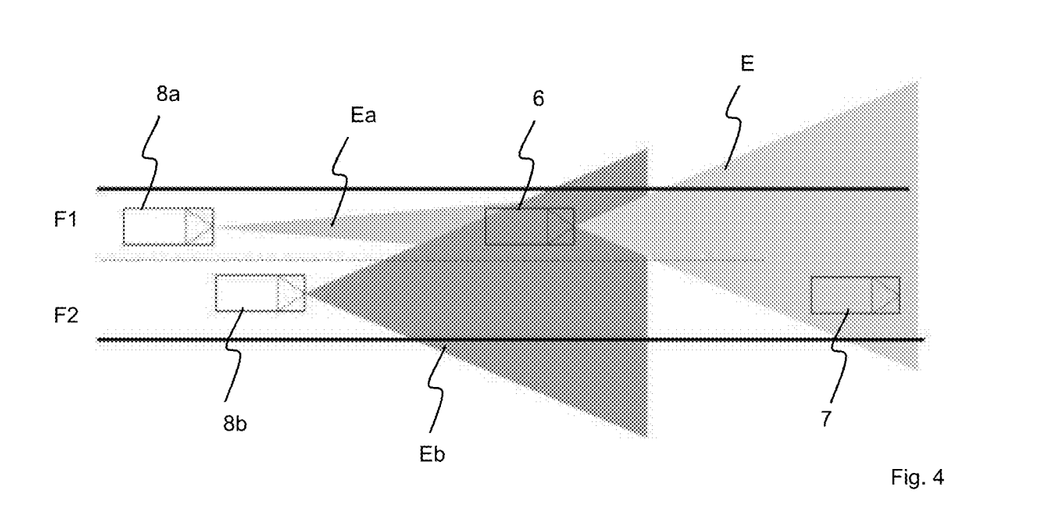
FIG. 4 is a diagram illustrating a schematic representation of a further scene, according to an embodiment.

FIG. 4 shows a schematic representation of a further scene according to a further embodiment of the embodiment. In this configuration, the ego vehicle 6 detects in its perception region E a further vehicle 7. As in the scene shown in FIG. 3, the vehicle 7 transfers its position data to the ego vehicle 6, which compares the detected position with the transferred position. In this configuration, a difference in the position between ego vehicle 6 and the further vehicle 7 was ascertained repeatedly. In this exemplary embodiment, the ego vehicle 6 has detected the vehicle 7 or a plurality of further vehicles 7, and each of these vehicles 7 has transferred a CAM message containing the position data. In such a case, an erroneous CAM message can be ruled out if the difference repeatedly occurs, for instance when observing a plurality of other vehicles 7 and their CAM messages, and it can assumed that the other vehicles 7 are not all transferring erroneous CAM messages, because these are generated independently of each other. Therefore in such a case, it can be inferred that there must be a malfunction in the ego-localization or in the ego-sensors.

In order to be able to distinguish further between these two causes, in this example there are two additional vehicles 8a and 8b situated behind the ego vehicle 6 that have on-board sensors and a V2V communication unit 4. The ego vehicle 6 is situated in the perception region Ea and Eb of the additional vehicles 8a, 8b and hence in their environment model. In this example, the vehicles 8a, 8b now communicate their environment model and their absolute position to the ego vehicle 6. In the ego vehicle, the position of the ego vehicle 6 communicated via the received environment models is then compared with the ego-localization. If the positions coincide, then the cause of the error can be isolated to a malfunction of the ego-sensors.

Figure 5:
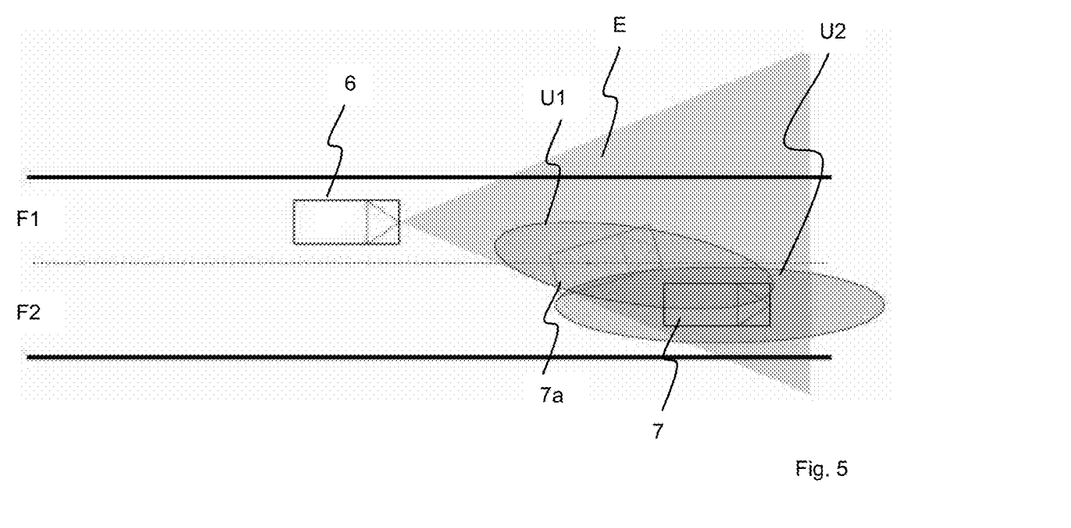
FIG. 5 is a diagram illustrating a schematic representation of a further scene, according to an embodiment.

FIG. 5 shows a schematic representation of a further scene according to a further embodiment of the embodiment. This scene corresponds substantially to the representation in FIG. 3. Again in this case, a further vehicle 7 is situated in the perception region E of the ego vehicle 6, and the further vehicle 7 is communicating its position data, for example by means of a CAM message. The ego vehicle 6 compares the communicated position with the position perceived by the environment perception sensor 2. In this configuration, the evaluation additionally incorporates uncertainties U2, for instance uncertainties in position, sent jointly in the CAM message from the further vehicle 7, and also the uncertainty U1 in the object track 7a of the further vehicle 7 generated by the ego vehicle 6 in the online environment model. If, for example, a difference in position exists between both information sources that can, however, be explained by the uncertainties, then it is rightly inferred that there is not a malfunction in the context of the exemplary embodiment of FIG. 3 and of the other figures. The uncertainties U1, U2 are elliptical in form here. Other geometrical shapes would also be conceivable.

Figure 6:
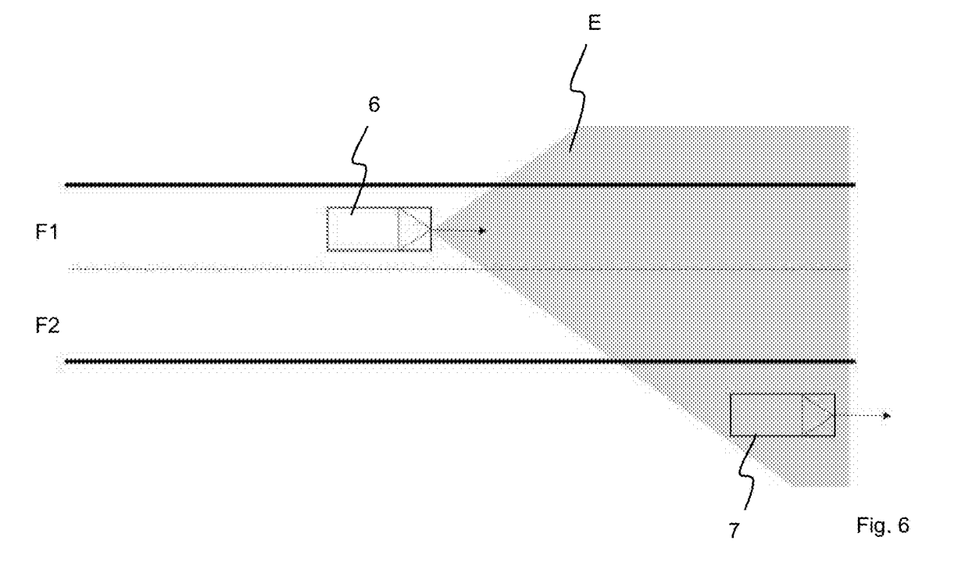
FIG. 6 is a diagram illustrating a schematic representation of a further scene, according to an embodiment.

FIG. 6 shows a schematic representation of a further scene according to a further embodiment of the embodiment. Again in this case, a further vehicle 7 is situated in the perception region E of the ego vehicle 6, and the further vehicle 7 is communicating its position data, for example by means of a CAM message. The ego vehicle 6 compares the communicated position with the position perceived by the environment perception sensor 2. In this configuration, the cause of the error is isolated by additional context knowledge, for example knowledge of the lanes. For instance, it can be assumed here that the further vehicle 7 is moving in a lane F2 contained in a digital map of the ego vehicle. If, in the sent CAM message, the vehicle 7 is situated in the lane F2 of the digital map of the ego vehicle in which the ego vehicle has located itself, then an error in the ego-sensors or the environment perception sensor 2 can be inferred.

If, on the other hand, in the digital map created by means of the ego-localization and in the environment model generated by the ego vehicle, the further vehicle 7 were to be travelling in the lane F2, but the vehicle 7 is transferring a CAM message in which the position of the vehicle 7 is given as beside the lanes F1, F2 suitable for driving, an error in the CAM message could be inferred. In this case, the further vehicle 7 could be warned by the ego vehicle 6 that it is highly likely that an error exists in the localization by the further vehicle 7.

Figure 7:
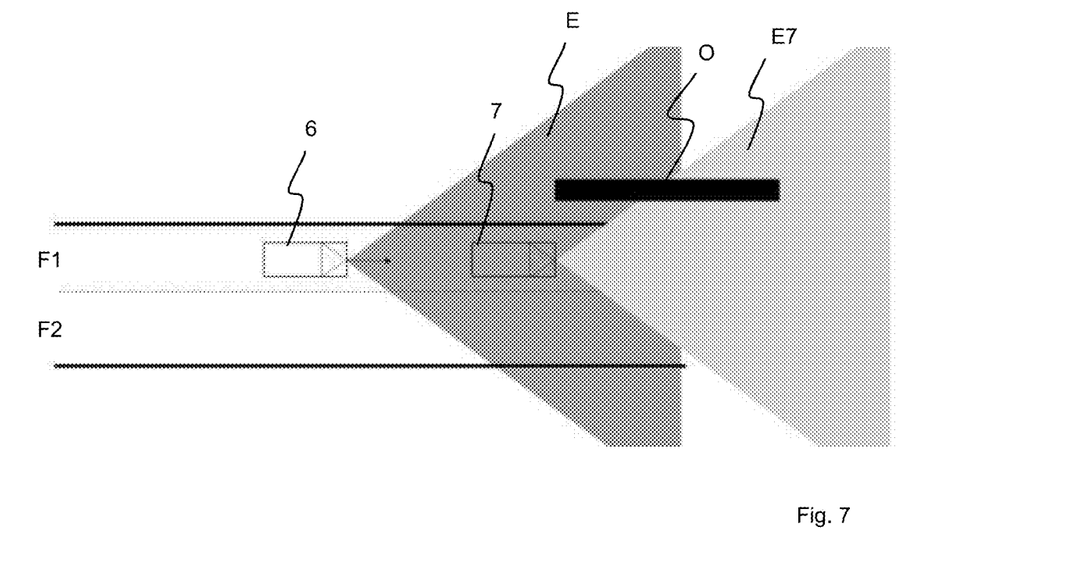
FIG. 7 is a diagram illustrating a schematic representation of a scene, according to an embodiment.

FIG. 7 shows a schematic representation of a further scene according to a further embodiment of the embodiment. In this configuration, the ego vehicle 6 and the further vehicle 7 are situated in the lane F1. The ego vehicle 6 and the further vehicle each detect the same static environment model object O in the respective perception regions E and E7 of the respective environment perception sensors. The environment model object O can be, for example, a road sign, a light signal installation, or an arrow marked on the ground, or the like. The further vehicle 7 sends its static environment model, for instance via CPM message, and its absolute position, for instance via CAM message, to the ego vehicle. If a difference is determined between the static environment models of the ego vehicle 6 and of the further vehicle 7, then there may exist erroneous ego-localization, defective ego-sensors, e.g. caused by decalibration, an erroneous environment model of the further vehicle 7, or erroneous localization by the further vehicle 7. If now, however, for example, the static environment model object is consistently in the same location in the environment model of the ego vehicle 6 and of the further vehicle 7, which location is identified purely by the respective environment perception sensors, then the error can be isolated to an incorrect localization by the further vehicle 7 or an incorrect localization by the ego vehicle 6. If now, in addition, the static environment object O is present in the digital map on which the ego vehicle has located itself, and thus is known to the ego vehicle 6 and is in the position expected by the environment model of the ego vehicle 6, then the error can be isolated further to an incorrect localization by the further vehicle 7. Thus the further vehicle 7 can be warned by the ego vehicle, for instance so that it can downgrade its automated driving function.

It would be conceivable in this configuration that the environment models are not represented as environment models containing static objects but as an environment model containing free spaces, for example as a free-space map and not as an occupancy grid. The difference would accordingly be implemented by comparing the determined free spaces.

Figure 8:
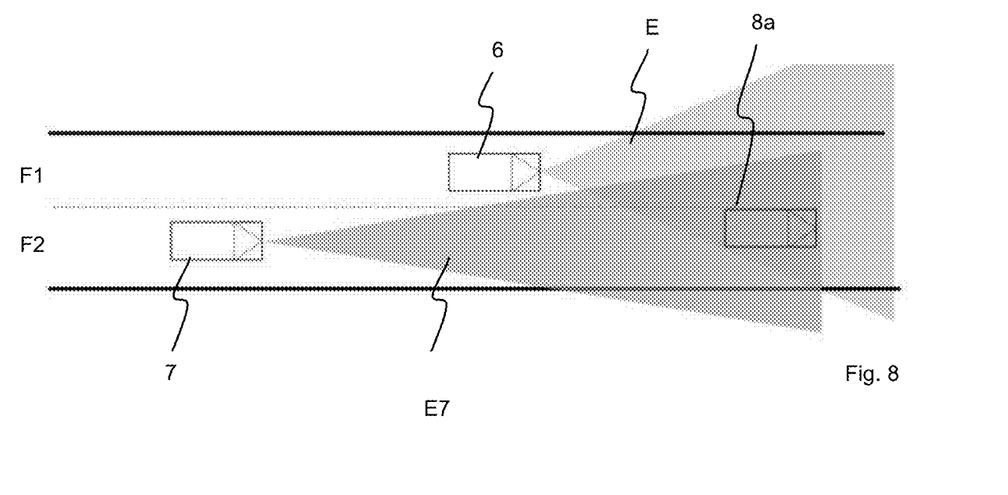
FIG. 8 is a diagram illustrating a schematic representation of a further scene according to an embodiment.

FIG. 8 shows a schematic representation of a further scene according to a further embodiment of the embodiment. In this configuration, the ego vehicle 6 and the further vehicle 7 detect the same additional vehicle 8a by means of the respective environment sensors. The further vehicle 7 sends its environment model, in which the additional vehicle 8a is entered, to the ego vehicle 6. The additional vehicle 8a sends its own status, comprising absolute position data, speed, turning-indicator activity, etc., to the ego vehicle 6. If the ego vehicle 6 now ascertains a difference between the status sent by the vehicle 8a and both the status of the additional vehicle 8a determined by the ego vehicle 6 and the status of the vehicle 8a transferred from the further vehicle 7 to the ego vehicle 6, then incorrect information in the message from the vehicle 8a can be inferred, because this differs from the matching observation by the ego vehicle 6 and the further vehicle 7. In this case, vehicle 8a can be warned by the ego vehicle 6 by means of V2V communication that there is an error in the message. This warning can be very specific. For example, if both the ego vehicle 6 and the further vehicle 7 ascertain by means of their environment sensors that the additional vehicle 8a does not have an active turning-indicator, and if the additional vehicle 8a is sending in its message that the turning-indicator is active, then the ego vehicle 6 can send the specific message "faulty turning-indicator" to the additional vehicle 8a. Further error messages such as incorrect speed transferred, incorrect position transferred, etc., for example, are also conceivable.

The invention claimed is:

1. A method for determining sensor error, the method comprising:
    recording a vehicle environment of an ego vehicle by an environment perception sensor of the ego vehicle;
    generating an environment representation based on the recording by the environment perception sensor;
    analyzing the environment representation in the ego vehicle by an analysis unit;
    determining environment information based on the analysis of the environment representation;
    entering the environment information in an environment model, wherein the environment information comprises an absolute position of the ego vehicle;
    determining at least one further vehicle in the environment representation from the environment perception sensor of the ego vehicle, wherein the environment information comprises a perceived position of the at least one further vehicle relative to the ego vehicle;
    transmitting information from the at least one further vehicle to the ego vehicle by a vehicle-to-vehicle communication unit, wherein the transmitted information comprises a first absolute position of the at least one further vehicle;
    comparing (i) a second absolute position of the at least one further vehicle determined from the absolute position of the ego vehicle and the perceived position of the at least one further vehicle with (ii) the first absolute position of the at least one further vehicle;
    determining a sensor error based on the result of the comparing; and
    deactivating at least one of a driver assistance system and a vehicle autonomous system based on a determination of the sensor error.

2. The method as claimed in claim 1, wherein determining the sensor error comprises neural networks and/or probabilistic models and/or fuzzy logic approaches and/or probabilistic logic determining the sensor error.

3. The method as claimed in claim 1, wherein determining the sensor error comprises determining whether the sensor error is present in the ego vehicle or in the at least one further vehicle.

4. The method as claimed in claim 3, wherein if the determined sensor error is present in the at least one further vehicle the at least one further vehicle is informed of the error by the ego vehicle or a backend server and the at least one further vehicle deactivates at least one of its respective driver assistance system and its respective vehicle autonomous system.

5. The method as claimed in claim 1, wherein determining the sensor error comprises transmitting further information from additional vehicles that detect the ego vehicle by at least one environment perception sensor.

6. The method as claimed in claim 5, wherein the information from the at least one further vehicle and from the additional vehicles is transferred by means of a CAM and/or a CPM.

7. The method as claimed in claim 5, wherein determining the sensor error comprises determining the sensor error based on uncertainties in the position of the further vehicle in the CAM message and/or uncertainties in the position of the further vehicle,
   wherein the position of the further vehicle is detected by the ego vehicle and tracked in the environment model.

8. The method as claimed claim 7, wherein determining the sensor error comprises determining the sensor error based on driving context knowledge.

* * * * *